(12) United States Patent
Ahn et al.

(10) Patent No.: US 12,309,904 B2
(45) Date of Patent: May 20, 2025

(54) COOKING APPARATUS, CONTROL METHOD, AND CONTROL SYSTEM THEREOF

(71) Applicant: Samsung Electronics Co., Ltd., Suwon-si (KR)

(72) Inventors: Juneok Ahn, Suwon-si (KR); Jaewoong Kim, Suwon-si (KR); Sanghoon Han, Suwon-si (KR); Sanga Kim, Suwon-si (KR); Yunkyeong Lee, Suwon-si (KR); Useong Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1013 days.

(21) Appl. No.: 17/342,956

(22) Filed: Jun. 9, 2021

(65) Prior Publication Data

US 2022/0022290 A1    Jan. 20, 2022

(30) Foreign Application Priority Data

Jul. 15, 2020    (KR) ........................ 10-2020-0087595

(51) Int. Cl.
  *A47J 36/32*    (2006.01)
  *F24C 7/08*    (2006.01)
  (Continued)

(52) U.S. Cl.
  CPC .......... *H05B 6/6441* (2013.01); *A47J 36/321* (2018.08); *F24C 7/083* (2013.01);
  (Continued)

(58) Field of Classification Search
  CPC .. H05B 6/062; H05B 2213/06; H05B 1/0266; H05B 6/6435; H05B 6/6438;
  (Continued)

(56) References Cited

U.S. PATENT DOCUMENTS 9,307,069 B2    4/2016    Tak et al.
9,978,260 B2    5/2018    Lee et al.
(Continued)

FOREIGN PATENT DOCUMENTS

CN    108255076 A    7/2018
JP    3164198    5/2001
(Continued)

OTHER PUBLICATIONS

Written Opinion of the International Searching Authority mailed Oct. 5, 2021 in International Application No. PCT/KR/2021/007666.
(Continued)

*Primary Examiner* — Chris Q Liu
(74) *Attorney, Agent, or Firm* — STAAS & HALSEY LLP

(57) ABSTRACT

A cooking apparatus includes an input interface configured to receive a control command for an operation of the cooking apparatus, a communication interface configured to communicate with a terminal device, a memory configured to store information related to limitation of a cooking operation received from the terminal device, and a processor configured to perform the input control command based on the information related to the limitation of the cooking operation, and the processor is configured to, based on a cooking operation command being received via the input interface in a cooking operation limitation state set according to the information related to the limitation of the cooking operation, control the communication interface to request the terminal device for release of the limitation of the cooking operation, and based on a release command being
(Continued)

received from the terminal device, perform the input cooking operation command.

14 Claims, 14 Drawing Sheets

(51) Int. Cl.
  *G05B 15/02* (2006.01)
  *H05B 6/64* (2006.01)
  *H05B 6/80* (2006.01)
(52) U.S. Cl.
  CPC ........... *G05B 15/02* (2013.01); *H05B 6/6438* (2013.01); *H05B 6/80* (2013.01)
(58) Field of Classification Search
  CPC .. H05B 6/6447; H05B 1/0261; H05B 1/0263; H05B 2206/044; H05B 3/68; H05B 3/70; H05B 3/72; H05B 6/02; H05B 6/06; H05B 6/1209; H05B 6/6402; H05B 6/6441; H05B 6/6482; H05B 6/6494; H05B 6/687; H05B 6/705; A47J 36/321; A47J 27/004; A47J 27/62; A47J 27/56; A47J 27/0802; A47J 27/10; A47J 27/14; A47J 36/32; A47J 37/0611; A47J 37/0676; A47J 37/08; A47J 37/0842; A47J 37/085; A47J 43/0716
  USPC .................. 99/325, 331, 330, 337, 391, 393
  See application file for complete search history.

(56) References Cited

U.S. PATENT DOCUMENTS

| 2014/0148147 | A1 | 5/2014 | Tak et al. |
| 2016/0178215 | A1* | 6/2016 | Lee .......................... F24C 7/086 426/231 |
| 2018/0313544 | A1 | 11/2018 | Lee et al. |
| 2019/0154266 | A1 | 5/2019 | Egenter et al. |
| 2019/0159627 | A1 | 5/2019 | Blond et al. |
| 2021/0164663 | A1 | 6/2021 | Yoon |

FOREIGN PATENT DOCUMENTS

| JP | 2015-8804 | 1/2015 |
| JP | 2018-44718 | 3/2018 |
| KR | 10-2014-0069687 | 6/2014 |
| KR | 10-2016-0149014 | 12/2016 |
| KR | 10-2017-0053893 | 5/2017 |
| KR | 10-2017-0078301 | 7/2017 |
| KR | 10-1865608 | 6/2018 |
| KR | 10-1873425 | 7/2018 |
| KR | 10-1987872 | 6/2019 |
| KR | 10-2020-0042449 | 4/2020 |

OTHER PUBLICATIONS

International Search Report mailed Oct. 5, 2021 in International Application No. PCT/KR/2021/007666.

* cited by examiner

FIG. 5

| LEVEL | ALLOWANCE AUTHORITY FOR COOKING APPARATUS CONTROL |
|---|---|
| 1 | MONITORING |
| 2 | MONITORING, LIMITATION SETTING OF COOKING OPERATION |
| 3 | MONITORING, LIMITATION SETTING OF COOKING OPERATION, AND SELF-RELEASE OF COOKING OPERATION LIMITATION |
| 4 | MONITORING, LIMITATION SETTING OF COOKING OPERATION, AND SELF-RELEASE OF COOKING OPERATION LIMITATION, TRANSMITTING LIMITATION RELEASE COMMAND OF COOKING OPERATION OF ANOTHER USER FROM OUTSIDE |
| 5 | MONITORING, LIMITATION SETTING OF COOKING OPERATION, AND SELF-RELEASE OF COOKING OPERATION LIMITATION, TRANSMISSION OF LIMITATION RELEASE COMMAND OF COOKING OPERATION OF ANOTHER USER FROM OUTSIDE, AUTOMATICALLY TURNING OFF COOKING OPERATION LIMITATION SETTING, IF USER IS IN HOUSE |

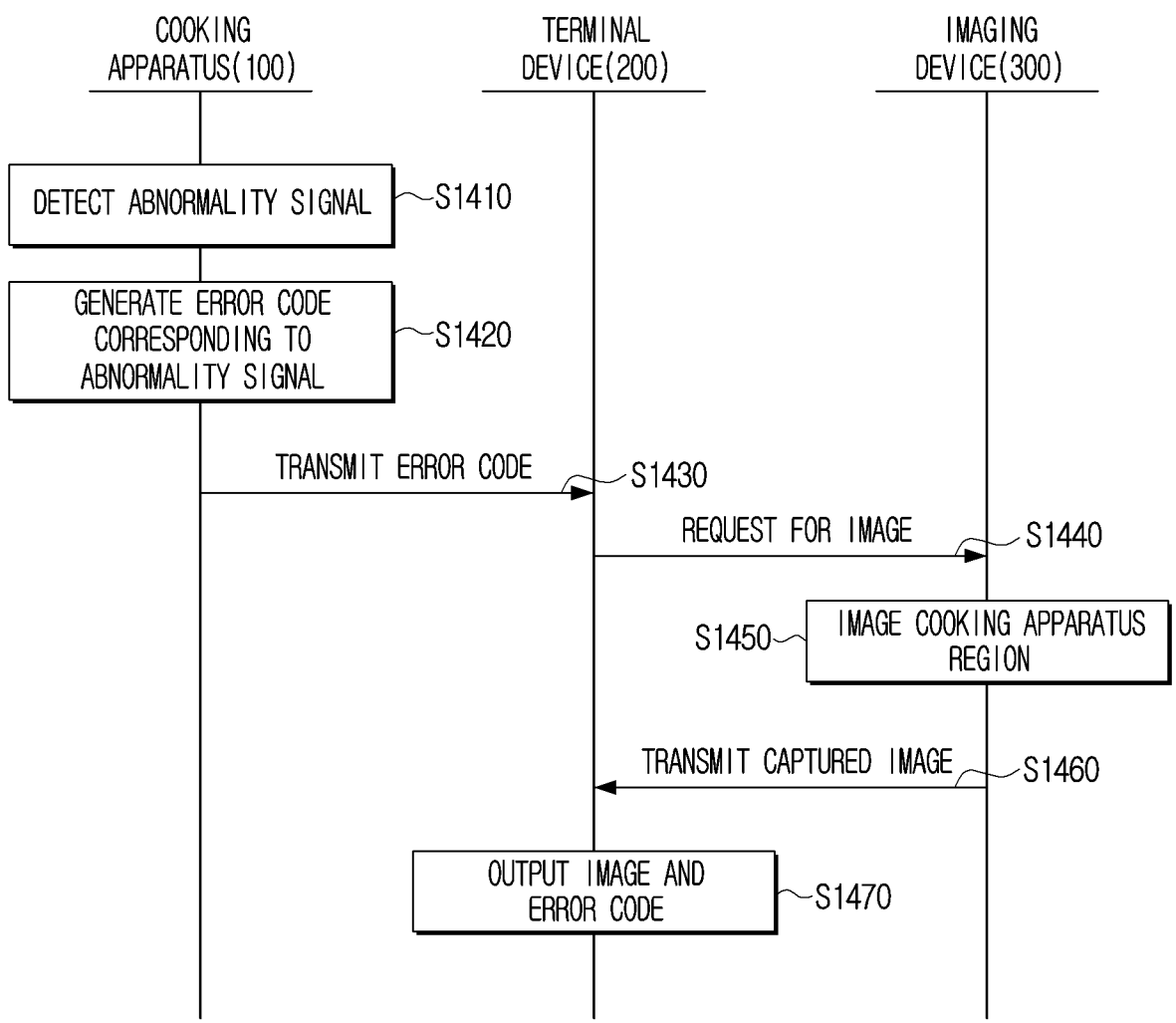

COOKING APPARATUS, CONTROL METHOD, AND CONTROL SYSTEM THEREOF

CROSS-REFERENCE TO RELATED APPLICATION

This application is based on and claims priority under 35 U.S.C. § 119 to Korean Patent Application No. 10-2020-0087595, filed on Jul. 15, 2020, in the Korean Intellectual Property Office, the disclosure of which is incorporated by reference herein in its entirety.

BACKGROUND

1. Field

The disclosure relates to a cooking apparatus, a control method, and a control system, and more particularly to, a cooking apparatus controlling a cooking operation of the cooking apparatus, a control method, and a control system.

2. Description of Related Art

A cooking apparatus is an apparatus for cooking food by generating heat directly or indirectly. In a cooking apparatus of the related art, a method for generating heat by using supplied gas was applied, but in recent years, with development of electronic technologies, a method for generating heat by using electricity has been applied. Since the cooking apparatus is used to cook the food by generating heat, there is a high risk of fire and burn.

The cooking apparatus includes a button such as a safety lock, a kids lock, or the like for reducing a risk of fire and burn due to control malfunction. In other words, when a user performs an input operation satisfying a certain standard through the lock button, the cooking apparatus prevents the control malfunction by activating control authority. In the control activation method using a physical button such as the lock button, the control authority is activated, if a button manipulation satisfying the certain standard is input unintentionally, and accordingly, there is still a possibility of malfunction. In order to solve such a problem, a method using a key pattern or a fingerprint recognition has been proposed, but there are disadvantages that usability of the cooking apparatus is deteriorated or hardware needs to be added.

Therefore, there is need for a technology of preventing the control malfunction without problems such as addition of separate hardware or deterioration in usability.

SUMMARY

In accordance with an embodiment for achieving the object, there is provided a cooking apparatus including an input interface configured to receive a control command for an operation of the cooking apparatus, a communication interface configured to communicate with a terminal device, a memory configured to store information related to limitation of a cooking operation received from the terminal device, and a processor configured to perform the input control command based on the information related to the limitation of the cooking operation, in which the processor is configured to, based on a cooking operation command being received via the input interface in a cooking operation limitation state set according to the information related to the limitation of the cooking operation, control the communication interface to request the terminal device for release of the limitation of the cooking operation, and based on a release command being received from the terminal device, perform the input cooking operation command.

The processor may be configured to receive control allowance level information regarding the cooking apparatus from the terminal device via the communication interface and store the received control allowance level information in the memory by matching to identification information of the terminal device, and the control allowance level information may include a plurality of levels allowing different control authorities and is set on a plurality of terminal devices at different levels.

The processor may be configured to control the communication interface so as to request a terminal device set at a level with release authority for the limitation of the cooking operation among the plurality of terminal devices for release of limitation of the cooking operation.

The information related to the limitation of the cooking operation may include at least one information of time information or distance information.

The processor may be configured to, based on the information related to the limitation of the cooking operation being time information, control the communication interface so as to receive information regarding limitation time of the cooking operation from a terminal device set at a level with limitation authority of the cooking operation, and set the cooking apparatus in the cooking operation limitation state based on the limitation time of the cooking operation.

The processor may be configured to, based on the information related to the limitation of the cooking operation being distance information, control the communication interface so as to periodically receive distance information from a terminal device set at a level with limitation authority of the cooking operation and set the cooking apparatus in the cooking operation limitation state based on the distance from the terminal device set at the level with the limitation authority of the cooking operation.

The cooking apparatus may further include a sensor, and the processor may be configured to, based on an abnormality signal of the cooking apparatus being detected via the sensor, generate an error code corresponding to the detected abnormality signal and transmit the generated error code to the terminal device.

In accordance with another embodiment for achieving the object, there is provided a method for controlling a cooking apparatus, the method including receiving information related to limitation of a cooking operation, storing the received information related to the limitation of the cooking operation, based on a cooking operation command being input in a cooking operation limitation state set according to the information related to the limitation of the cooking operation, requesting for release of the limitation of the cooking operation, and based on a release command being received, performing the input cooking operation command.

The method for controlling a cooking apparatus may further include receiving control allowance level information regarding the cooking apparatus, and storing the received control allowance level information by matching to identification information of the terminal device, and the control allowance level information may include a plurality of levels allowing different control authorities and is set on a plurality of terminal devices at different levels.

The requesting may include requesting a terminal device set at a level with release authority for the limitation of the cooking operation among the plurality of terminal devices for release of limitation of the cooking operation.

The information related to the limitation of the cooking operation may include at least one information of time information or distance information.

The receiving the information may include, based on the information related to the limitation of the cooking operation being time information, receiving information regarding limitation time of the cooking operation from a terminal device set at a level with limitation authority of the cooking operation, and the method for controlling a cooking apparatus may further include setting the cooking apparatus in the cooking operation limitation state based on the limitation time of the cooking operation.

The receiving the information may include, based on the information related to the limitation of the cooking operation being distance information, periodically receiving distance information from a terminal device set at a level with limitation authority of the cooking operation, and the method for controlling a cooking apparatus may further include setting the cooking apparatus in the cooking operation limitation state based on the distance from the terminal device set at the level with the limitation authority of the control operation.

The method for controlling a cooking apparatus may further include, based on an abnormality signal of the cooking apparatus being detected, generating an error code corresponding to the detected abnormality signal, and transmitting the generated error code to the terminal device.

In accordance with still another embodiment for achieving the object, there is provided a cooking apparatus control system including a terminal device and a cooking apparatus, the system including the cooking apparatus configured to receive a control command for an operation of the cooking apparatus, and the terminal device configured to transmit information related to limitation of a cooking operation to the cooking apparatus, and the cooking apparatus may be configured to store the received information related to the limitation of the cooking operation, based on a cooking operation command being received in a cooking operation limitation state set according to the information related to the limitation of the cooking operation, request the terminal device for release of the limitation of the cooking operation, and based on a release command being received from the terminal device, perform the input cooking operation command.

The cooking apparatus may be configured to receive control allowance level information regarding the cooking apparatus from the terminal device and store the received control allowance level information by matching to identification information of the terminal device, and the control allowance level information may include a plurality of levels allowing different control authorities and is set on a plurality of terminal devices at different levels.

The cooking apparatus may be configured to request a terminal device set at a level with release authority for the limitation of the cooking operation among the plurality of terminal devices for release of limitation of the cooking operation.

The cooking apparatus may be configured to, based on an abnormality signal being detected, generate an error code corresponding to the detected abnormality signal and transmit the generated error code to the terminal device.

The cooking apparatus control system may further include an imaging device configured to image the cooking apparatus, and the imaging device is configured to, based on image transmission being requested from the terminal device, image a region including the cooking apparatus and transmit the captured image to the terminal device.

The imaging device may include at least one imaging device among a fixed imaging device or a movable imaging device.

According to various embodiments of the disclosure, the cooking apparatus, the control method, and the control system may prevent malfunction of the cooking apparatus.

The effects of the disclosure are not limited to the effects mentioned above and other effects not mentioned above may be clearly understood by those skilled in the art from the description below.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 5 is a diagram illustrating control allowance level information according to an embodiment;

FIG. 14 is a sequence diagram illustrating a process of determining whether the cooking apparatus is abnormal based on the captured image according to an embodiment.

DETAILED DESCRIPTION

Figure 1:
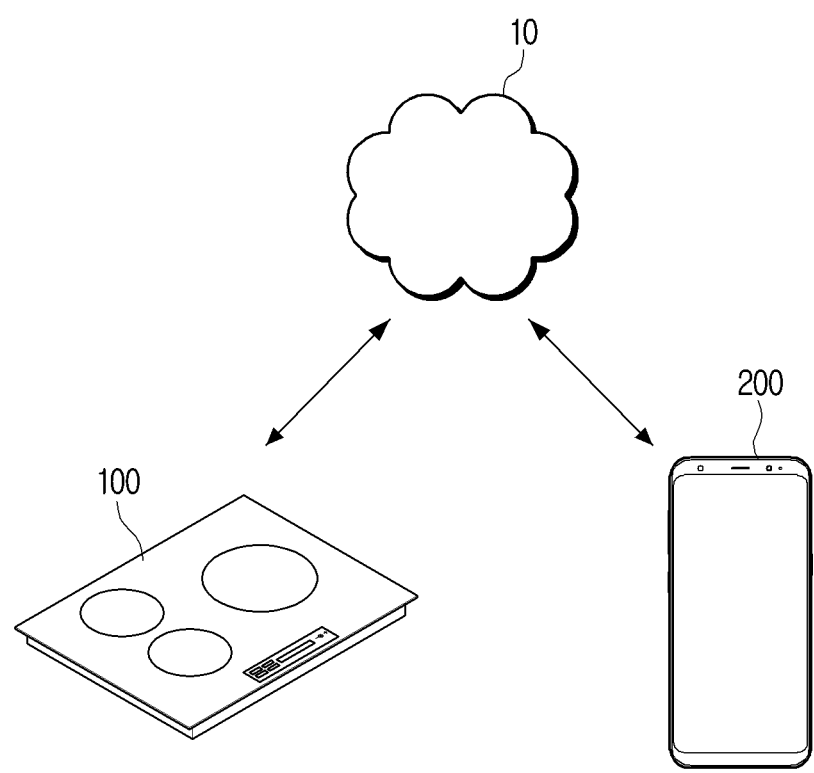
FIG. 1 is a diagram illustrating a cooking apparatus control system according to an embodiment.

Hereinafter, various embodiments will be described in more detail with reference to the accompanying drawings. The embodiments disclosed in the specification may be variously changed. A specific embodiment may be illustrated in the drawing and described in detail in the detailed description. However, the specific embodiment disclosed in the accompanying drawing is merely for easy understanding of various embodiments. Accordingly, it should be understood that the technical spirit is not limited to the specific embodiment disclosed in the accompanying drawing, and all equivalents or alternatives included in the disclosed spirit and technical scope are included.

The terms including ordinals such as "first" or "second" may be used for describing various components, but the components are not limited by the above terms. The above terms may be only used for distinguishing one component from another.

It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof. If it is described that a certain element is "connected to" or "coupled to" another element, it should be understood that the certain element may be connected to the other element directly or through still another element. On the other hand, if it is described that a certain element is "directly coupled to" or "directly connected to" another element, it may be understood that there is no element therebetween.

Meanwhile, a "module" or a "unit" regarding an element used in the disclosure may perform at least one function or operation. In addition, the "module" or the "unit" may perform the function or the operation by hardware, software, or a combination of hardware and software. In addition, a plurality of "modules" or a plurality of "units", except for a "module" or a "unit" which should be performed in specific hardware or performed in at least one processor, may be integrated into one module. Unless otherwise defined specifically, a singular expression may encompass a plural expression.

In the specification, "A or B" does not only selectively indicate any one of A and B, but is defined to include both A and B. In addition, a term "including" in the disclosure may have meaning of further including other elements, in addition to the listed elements.

In the specification, compulsory elements necessary for the description of the disclosure are only described and elements with no relation with the gist of the disclosure may not be mentioned. It should not be interpreted as exclusive meaning of including only the mentioned elements, but should be interpreted as non-exclusive meaning of including other elements.

In addition, in describing the disclosure, a detailed description of the related art or configuration may be omitted when it is determined that the detailed description may unnecessarily obscure a gist of the disclosure. Meanwhile, each embodiment may be implemented or operated independently or the embodiment may also be implemented or operated in combination.

The disclosure is made to solve the aforementioned and other problems, and one aspect of the disclosure is to provide a cooking apparatus preventing a malfunction of the cooking apparatus without adding separate hardware, a control method, and a control system.

FIG. 1 is a diagram illustrating a cooking apparatus control system according to an embodiment.

Referring to FIG. 1, the cooking apparatus control system may include a cooking apparatus 100 and a terminal device 200.

The cooking apparatus 100 may receive a control command (one or more instructions) for operations of the cooking apparatus from a user. For example, the cooking apparatus 100 may include a microwave, an electric range (induction stove, induction range, induction cooktop, highlight, and the like), and the like. The control command for the operation of the cooking apparatus may include a cooking operation command, a general control operation command, and the like. For example, the cooking operation command may include commands for turning on/off a burner, cooking time setting, cooking temperature setting, and the like. The general control operation command may include commands for cooking operation limitation condition setting, cooking operation limitation time setting, current time setting, information transmission to the terminal device, and the like.

In addition, the cooking apparatus 100 may communicate with the terminal device 200 via a network 10. The cooking apparatus 100 may transmit or receive information directly to and from the terminal device 200 or may transmit or receive information via a separate external device such as a server or cloud.

The terminal device 200 may transmit information related to limitation of the cooking operation to the cooking apparatus 100. For example, the information related to the limitation of the cooking operation may include cooking operation limitation time, a distance from the terminal device for limiting the cooking operation, and the like. In addition, the terminal device 200 may transmit control allowance level information regarding the cooking apparatus to the cooking apparatus 100. For example, the control allowance level information may refer to information for applying authority related to the control of the cooking apparatus differently in a stepwise manner. Accordingly, the control allowance level information may include a plurality of levels. In addition, the terminal device 200 may also transmit identification information of the terminal device to the cooking apparatus 100. For example, the terminal device 200 may include a smartphone, a laptop computer, a navigation system, a slate personal computer (PC), a tablet PC, a wearable device, and the like.

The cooking apparatus 100 may receive and store the information related to the limitation of the cooking operation from the terminal device 200. In addition, the cooking apparatus 100 may receive the control allowance level information regarding the cooking apparatus and the identification information of the terminal device from the terminal device 200. The cooking apparatus 100 may store the received control allowance level information by matching to the received identification information of the terminal device. In other words, one cooking apparatus 100 may communicate with a plurality of terminal devices. If the plurality of terminal devices communicate with the cooking apparatus 100, different pieces of control allowance level information may be set for the plurality of terminal devices, respectively.

In an embodiment, one terminal device among the plurality of terminal devices may be a master terminal device. The master terminal device may set a group and include a slave terminal device for controlling the cooking apparatus 100 in the group. The master terminal device may set the control allowance level information at different levels on the slave terminal devices, respectively. The master terminal device may transmit the control allowance level information set on each terminal device to the cooking apparatus 100. Accordingly, the cooking apparatus 100 may transmit information to each terminal device 200 discriminately based on the control allowance level information. In addition, each terminal device 200 may control the cooking apparatus 100 discriminately based on the control allowance level information. The control allowance level information will be described in detail below.

The cooking apparatus 100 may set the cooking operation limitation state according to the received information related to the limitation of the cooking operation. In addition, the cooking apparatus 100 may receive the control command in the cooking operation limitation state. The cooking apparatus 100 may identify whether the input control command is a cooking operation command. The cooking apparatus 100 may confirm whether the cooking apparatus is in the cooking operation limitation state. If the cooking apparatus 100 receives the cooking operation command in the cooking operation limitation state, the cooking apparatus 100 may request the terminal device 200 for release of the limitation of the cooking operation. As described above, the cooking apparatus 100 may store the set control allowance level information together with the identification information of the terminal device 200. Therefore, the cooking apparatus 100 may request the terminal device 200 set at a level with the release authority for the limitation of the cooking operation for the release of the limitation of the cooking operation. In addition, if a release command is received from the terminal device 200, the cooking apparatus 100 may perform the input cooking operation command.

Figure 2:
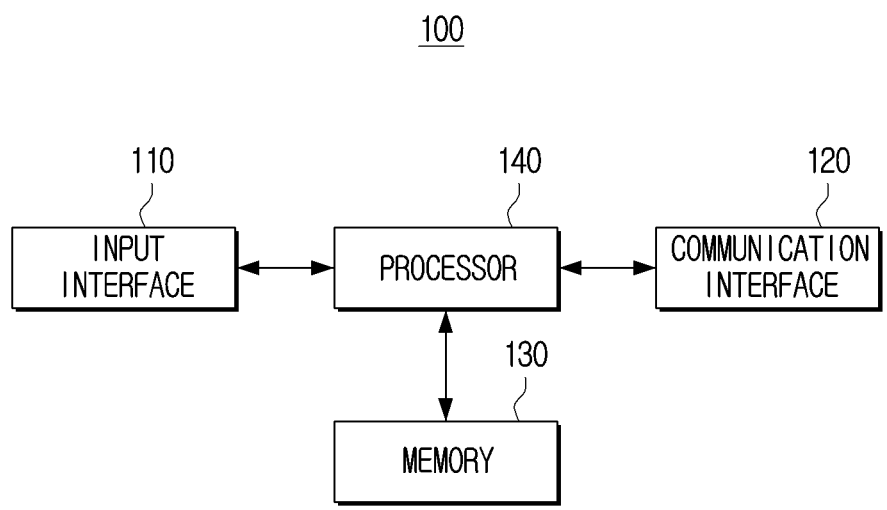
FIG. 2 is a block diagram of a cooking apparatus according to an embodiment.

FIG. 2 is a block diagram of a cooking apparatus according to an embodiment.

Referring to FIG. 2, the cooking apparatus 100 may include an input interface 110, a communication interface 120, a memory 130, and a processor 140.

The input interface 110 may receive a control command from a user. The control command may be a control command for the cooking operation or may be a control command for performing general control operation. For example, the input interface 110 may be implemented as any type of a keypad, a touch panel, a button, a rotational key, and the like. The input interface 110 may refer to an inputter, an input module, an input device, and the like.

The communication interface 120 may communicate with the terminal device. For example, the communication interface 120 may include a data network communication module through LTE, Wi-Fi, or Bluetooth, and may communicate with the terminal device via a short distance communication network and the Internet. The communication interface 120 may be not only connected directly to the terminal device for communication, but may also be connected indirectly via an external device such as a server, a cloud, or a web server to perform the communication. In addition, the communication interface 120 may include a GPS module to confirm a current location of the cooking apparatus 100. The communication interface 120 may refer to a communicator, a communication module, a communication device, or a transceiver.

The communication interface 120 may receive the information related to the limitation of the cooking operation from the terminal device. For example, the information related to the limitation of the cooking operation may include the cooking operation limitation time, the distance from the terminal device for limiting the cooking operation, and the like. In addition, the communication interface 120 may receive the control allowance level information and the identification information of the terminal device from the terminal device. For example, the control allowance level information may refer to information for applying authority related to the control of the cooking apparatus differently in a stepwise manner.

If the cooking operation command is input in the cooking operation limitation state, the communication interface 120 may transmit a signal for requesting for the release of the limitation of the cooking operation to the terminal device and receive the release command from the terminal device.

The memory 130 may store programs, data, and instructions related to the driving of the cooking apparatus 100. The memory 130 may store the information related to the limitation of the cooking operation received from the terminal device. In addition, the memory 130 may store the control allowance level information received from the terminal device by matching to the identification information (or account information) of the terminal device. For example, the memory 130 may be implemented as a ROM, a RAM, a HDD, an SSD, and the like.

The processor 140 may control each configuration of the cooking apparatus 100. For example, the processor 140 may set the cooking apparatus 100 in the cooking operation limitation state based on the information related to the limitation of the cooking operation.

The information related to the limitation of the cooking operation may be time information. In an embodiment, the information related to the limitation of the cooking operation may be information indicating that "the cooking operation limitation time is time from 1 p.m. to 5 p.m." If the information regarding the limitation time of the cooking operation is received from the terminal device, the processor 140 may set the cooking apparatus 100 from 1 p.m. to 5 p.m. in the cooking operation limitation state.

In addition, the information related to the limitation of the cooking operation may be distance information (or location information). In an embodiment, the information related to the limitation of the cooking operation may be information indicating that "the cooking operation limitation condition is condition in which the distance from the terminal device exceeds 1 km". The processor 140 may control the communication interface 120 so as to confirm the location of the terminal device periodically. In addition, the processor 140 may confirm the distance from the terminal device based on the received location information of the terminal device. If the distance from the terminal device satisfies the cooking operation limitation condition, the processor 140 may set the cooking apparatus 100 in the cooking operation limitation state. For example, the communication interface 120 of the cooking apparatus 100 may include a GPS module to confirm the location of the cooking apparatus 100. In this case, the processor 140 may confirm the distance between the cooking apparatus 100 and the terminal device based on the location information of the cooking apparatus 100 and the location information of the terminal device. In addition, the communication interface 120 of the cooking apparatus 100 may not include the GPS module and only the terminal device may include the GPS module. In this case, the terminal device may set a location of a house where the cooking apparatus 100 is installed. In addition, the terminal device may confirm the distance between the cooking apparatus 100 and the terminal device based on the house location information and the distance information from the terminal device. The processor 140 may confirm the distance between the cooking apparatus 100 and the terminal device based on the distance information (or location information) of terminal device) received from the terminal device.

If the control command is input from the user, the processor 140 may confirm whether the control command is the cooking operation command and the current state is the cooking operation limitation state. If the cooking operation command is input in the cooking operation limitation state, the processor 140 may control the communication interface 120 so as to request the terminal device for the release of the limitation of the cooking apparatus. If the cooking apparatus 100 receives the release command from the terminal device, the processor 140 may release the cooking operation limitation state and perform the cooking operation command.

As described above, the cooking apparatus 100 may communicate with the plurality of terminal devices. The plurality of terminal devices may set the control allowance level at different levels. The processor 140 may confirm the terminal device set at a level with the release authority of the limitation of the cooking operation among the plurality of terminal devices. In addition, the processor 140 may control the communication interface 120 so as to transmit a signal for requesting for the release of the limitation to the terminal device set at the level with the release authority of the limitation of the cooking operation.

Meanwhile, the terminal device in the process of setting the cooking operation limitation state described above may be a terminal device set at the level with the cooking operation limitation authority.

Figure 3:
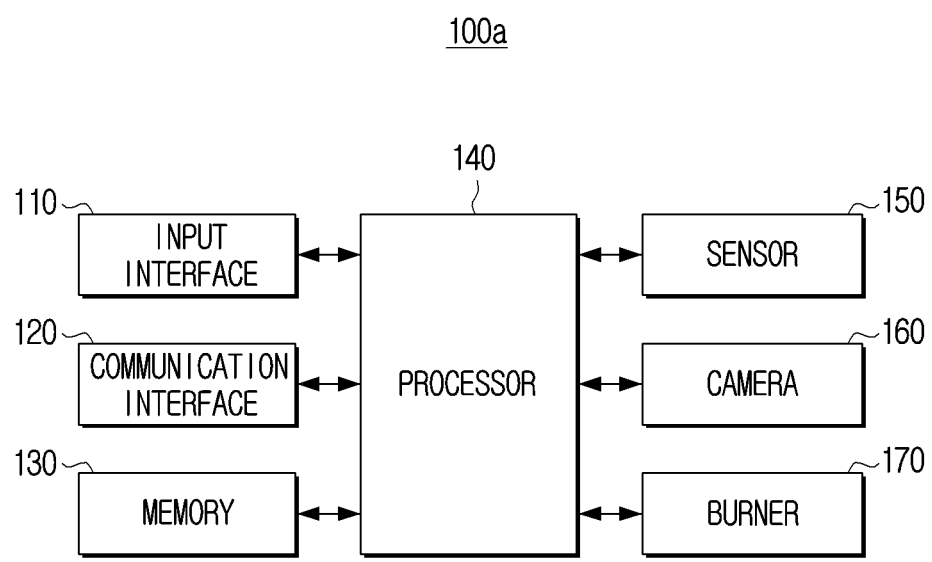
FIG. 3 is a specific block diagram of the cooking apparatus according to an embodiment.

FIG. 3 is a specific block diagram of the cooking apparatus according to an embodiment.

Referring to FIG. 3, a cooking apparatus 100a may include the input interface 110, the communication interface 120, the memory 130, the processor 140, a sensor 150, a camera 160, and a burner 170. The input interface 110, the communication interface 120, and the memory 130 are the same as those described in FIG. 2, and therefore the specific description will not be repeated.

The sensor 150 may detect an abnormal state of the cooking apparatus 100a and transfer an abnormality signal to the processor 140, if the abnormal state is detected. The processor 140 may generate a corresponding error code based on the transferred abnormality signal. In addition, the processor 140 may control the communication interface 120 so as to transmit the generated error code to the terminal device.

In an embodiment, the abnormality signal may include high temperature abnormality, sensor abnormality, voltage abnormality, communication abnormality, abnormal key input, and the like. The sensor 150 may include one or more different types of sensors in order to detect surrounding environment information. For example, the sensor 150 may include a voltmeter, an ammeter, a hygrometer, a thermometer, a heat detection sensor, a proximity sensor, a touch sensor, an acceleration sensor, a magnetic sensor, a gravity sensor, a gyroscope sensor, a motion sensor, an infrared sensor, an ultrasonic sensor, and the like.

The camera 160 may image the surrounding environment of the cooking apparatus 100a. The camera 160 may image the surrounding environment, if the image is requested from the terminal device. The processor 140 may control the camera 160 so as to image the surrounding environment and control the communication interface 110 so as to transmit the captured image to the terminal device. Meanwhile, the cooking apparatus 100a may not include the camera 160. In this case, the cooking apparatus control system may transmit the captured image to the terminal device using a surrounding camera. An embodiment in which the captured image is transmitted to the terminal device using the surrounding camera will be described later.

The burner 170 may supply heat to a cooking container during the cooking operation according to the control of the processor 140. In an embodiment, if the cooking apparatus 100a is a microwave, the burner 170 may include a coil and induce magnetic field by a current flowing to the coil. The magnetic field induced on the burner 170 may generate eddy currents by resistance components of the cooking container and heat the cooking container by the generated eddy currents. A cooking material in the cooking container may be cooked by the heated cooking container. In addition, the burner 170 may generate heat wires by applying the current to the heat wires including the resistance components. The heat generated in the heat wires may be transferred to the cooking container. The cooking material in the cooking container may be cooked by the cooking container to which the heat is transferred.

Accordingly, the cooking apparatus and the cooking apparatus control system may limit the cooking operation by the terminal device conveniently. In addition, the cooking apparatus and the cooking apparatus control system may basically block the operation of the cooking apparatus not intended by the user, when the user is absent, to eliminate possibility of fire and prevent danger of burns of animals or young children.

Hereinabove, the cooking apparatus and the control system including the cooking apparatus have been described. Hereinafter, various operations of the cooking apparatus will be described.

Figure 4:
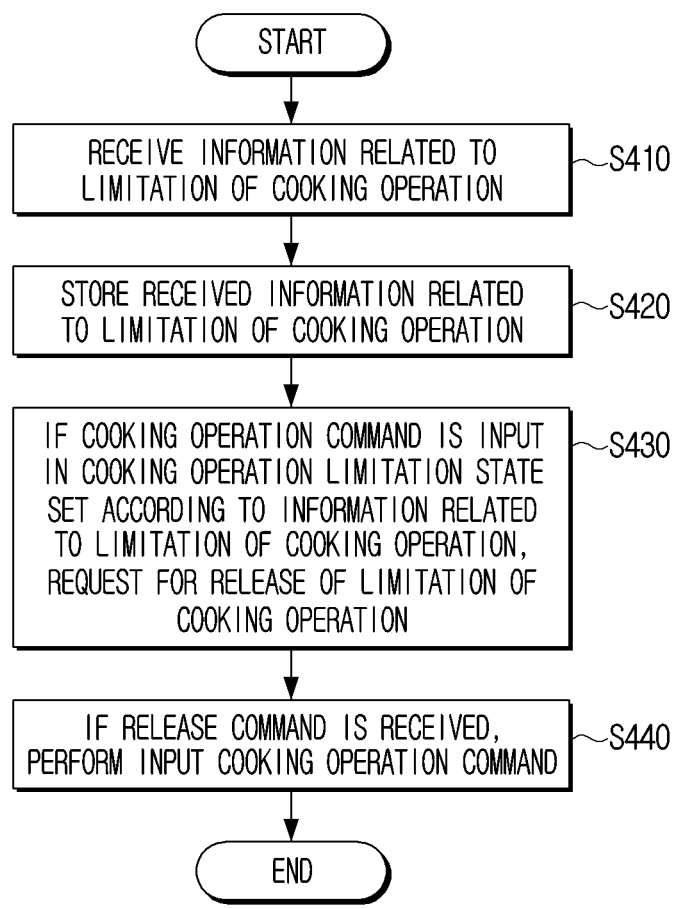
FIG. 4 is a flowchart of a method for controlling a cooking apparatus according to an embodiment.

FIG. 4 is a flowchart of a method for controlling a cooking apparatus according to an embodiment.

Referring to FIG. 4, the cooking apparatus may receive the information related to the limitation of the cooking operation from the terminal device (S410) and store the received information related to the limitation of the cooking operation (S420). For example, the information related to the limitation of the cooking operation may include time information, distance information (or location information), and the like. Meanwhile, the cooking apparatus may receive the control allowance level information regarding the cooking apparatus from the terminal device and store the received control allowance level information by matching to the identification information of the terminal device. The control allowance level information may include a plurality of levels allowing different control authorities, and the plurality of terminal devices may be set at different levels. The control allowance level information will be described in detail below.

The cooking apparatus may set the cooking operation limitation state according to the information related to the limitation of the cooking operation. For example, if the information related to the limitation of the cooking operation is time information, the cooking apparatus may receive information regarding the limitation time of the cooking operation from the terminal device set at the level with the limitation authority of the cooking operation. In addition, the cooking apparatus may set the cooking apparatus in the cooking operation limitation state based on the limitation time of the cooking operation.

If the information related to the limitation of the cooking operation is distance information, the cooking apparatus may receive periodically the distance information from the terminal device (or location information of terminal device) set at the level with the limitation authority of the cooking operation. The cooking apparatus may set the cooking apparatus in the cooking operation limitation state based on the distance from the terminal device set at the level with the limitation authority of the cooking operation. Meanwhile, in the above example, the cases where the information related to the limitation of the cooking operation is time information and distance information have been described, respectively, but the time information and the distance information may be applied together.

If the cooking operation command is input in the set cooking operation limitation state, the cooking apparatus may request for the release of the limitation of the cooking operation (S430).

The cooking apparatus may request the terminal device set at the level with the release authority of the limitation of the cooking operation among the plurality of terminal devices for the release of the limitation of the cooking operation. In addition, if the release command is received, the cooking apparatus may perform the input cooking operation command (S440).

Meanwhile, if an abnormality signal is detected, the cooking apparatus may generate an error code corresponding to the detected abnormality signal. In addition, the cooking apparatus may transmit the generated error code to the terminal device.

Hereinafter, the control allowance level information will be described.

FIG. 5 is a diagram illustrating control allowance level information according to an embodiment.

Referring to FIG. 5, an embodiment of the authority according to the control allowance level is illustrated. For example, the control allowance authority may be classified into five levels. A first level may include monitoring authority, a second level may include the monitoring authority and limitation setting authority of the cooking operation, a third level may include the monitoring authority, the limitation setting authority of the cooking operation, and self-release authority of the cooking operation limitation, a fourth level may include the monitoring authority, the limitation setting authority of the cooking operation, the self-release authority of the cooking operation limitation, and authority for transmitting a limitation release command of the cooking operation, when another user inputs the cooking operation command from the outside, and a fifth level may include the monitoring authority, the limitation setting authority of the cooking operation, the self-release authority of the cooking operation limitation, the authority for transmitting a limitation release command of the cooking operation, when another user inputs the cooking operation command from the outside, and authority for automatically turning off the cooking operation limitation setting if a user is in a house.

For example, the monitoring authority may be authority for receiving the cooking operation limitation setting state set on the cooking apparatus and an error code when the abnormality signal is detected. The limitation setting authority of the cooking operation may be authority for setting the condition for limiting the cooking operation. The self-release authority of the cooking operation limitation may be authority for transmitting the release command to the cooking apparatus, when the cooking apparatus is in the cooking operation limitation state. The authority for transmitting a limitation release command of the cooking operation, when another user inputs the cooking operation command from the outside may be authority for releasing the cooking operation limitation state, when another user inputs the cooking operation command to the cooking apparatus. The authority for automatically turning off the cooking operation limitation setting if a user is in a house may be authority for automatically turning off the cooking operation limitation state (activating the cooking operation) based on the distance information of the terminal device.

As descried above, one cooking apparatus may communicate with the plurality of terminal devices. The master terminal device may set a group and include a terminal device for performing the control operation regarding the one cooking apparatus in a group. In addition, the master terminal device may set the control allowance level on each terminal device included in the group. In an embodiment, the master terminal device may set the authority at the fifth level. Further, the master terminal device may set the control allowance level of a terminal device A in the group at the fourth level and set the control allowance level of a terminal device B at the first level. For example, the master terminal device may be a terminal device of father, the terminal device A may be a terminal device of mother, and the terminal device B may be a terminal device of a child. In the above example, the father may control all operations of the cooking apparatus. The mother may transmit the command for releasing the cooking operation limitation of another user, when the cooking apparatus is in the cooking operation limitation state. Accordingly, if the mother is outside and the child needs to use the cooking apparatus while the cooking apparatus is in the cooking operation limitation state, the mother may release the cooking operation limitation state. In other words, the malfunction of the cooking apparatus may be prevented by applying different control authorities to the plurality of terminal devices depending on users, and although the cooking apparatus is in the cooking operation limitation state, the cooking operation limitation state may be released as necessary.

Therefore, all users using the cooking apparatus may easily control the cooking apparatus and the cooking apparatus control system, and a master user may apply suitable control authority of the cooking apparatus and the cooking apparatus control system depending on users.

Hereinafter, various operations of the cooking apparatus will be described in detail.

Figure 6:
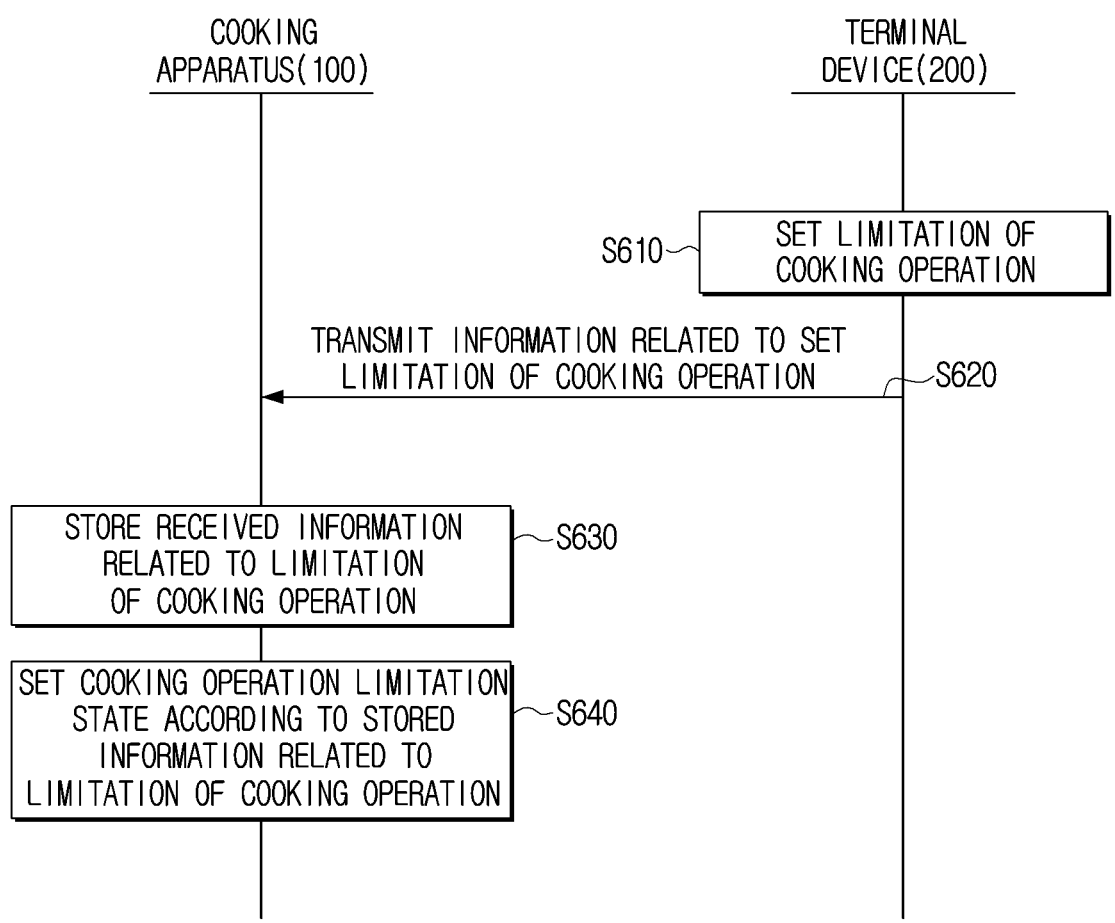
FIG. 6 is a sequence diagram illustrating a setting process of a cooking operation limitation state according to an embodiment.

FIG. 6 is a sequence diagram illustrating a setting process of a cooking operation limitation state according to an embodiment.

Referring to FIG. 6, the terminal device 200 may set the limitation condition of the cooking operation (S610). For example, the limitation condition of the cooking operation may include at least one of time condition and distance condition. If the plurality of terminal devices are connected to the cooking apparatus for communication, the terminal device set at the level with the limitation authority of the cooking operation may set the limitation condition of the cooking operation. In the example of FIG. 5, the terminal device set at the control allowance level of second or higher level may include the limitation authority of the cooking operation.

The terminal device 200 may transmit the information related to the set limitation of the cooking operation (S620). The cooking apparatus 100 may store the information related to the limitation of the cooking operation received from the terminal device 200 (S630). In addition, the cooking apparatus 100 may set the cooking operation limitation state according to the information related to the limitation of the cooking operation (S640). For example, if the information related to the limitation of the cooking operation is time information from 1 p.m. to 5 p.m., the cooking apparatus 100 may be set in the cooking operation limitation state at 1 p.m. In addition, the cooking apparatus 100 may release the cooking operation limitation state at 5 p.m. If the information related to the limitation of the cooking operation is distance information exceeding 1 km and if the distance of the terminal device (master terminal device, in a case of the plurality of terminal devices) from the cooking apparatus 100 exceeds 1 km, the cooking apparatus 100 may be set in the cooking operation limitation state.

Figure 7:
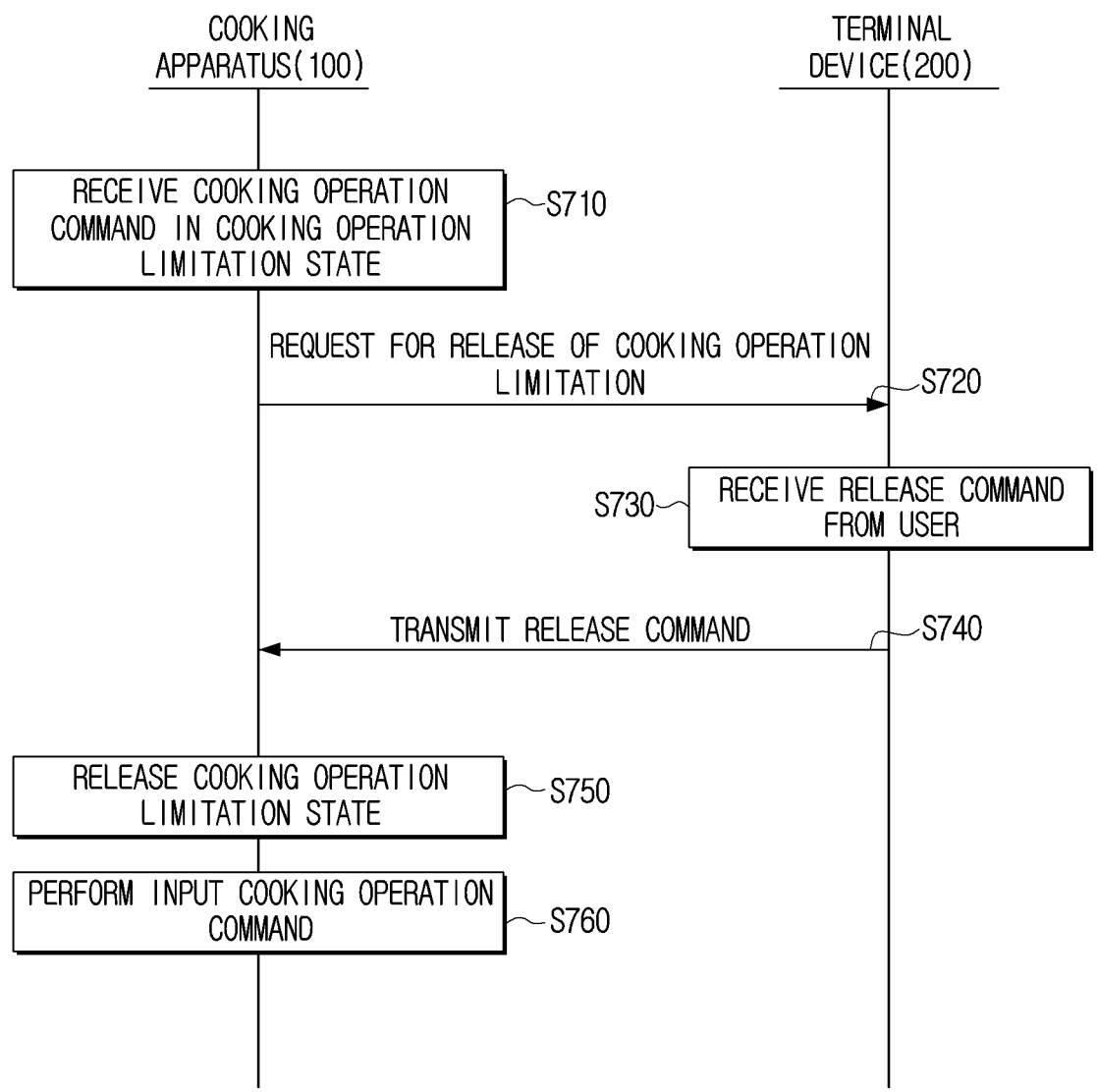
FIG. 7 is a sequence diagram illustrating a process of releasing the limitation state of the cooking operation according to an embodiment.

FIG. 7 is a sequence diagram illustrating a process of releasing the limitation state of the cooking operation according to an embodiment.

Referring to FIG. 7, the cooking apparatus 100 may receive a cooking operation command in the cooking operation limitation state (S710) and the cooking apparatus 100 may request for the release of the cooking operation limitation (S720). If there are a plurality of terminal devices, the cooking apparatus 100 may request the terminal device set at the level with the authority for transmitting the limitation release command of the cooking operation, when another user inputs the cooking operation command, for the release. In the example of FIG. 5, the terminal device set at the control allowance level at the fourth or higher level may include the cooking operation limitation release authority for the other users.

The terminal device 200 may receive the release command from the user (S730) and transmit the release command to the cooking apparatus 100 (S740). The cooking apparatus 100 may release the cooking operation limitation state according to the received release command (S750) and perform the input cooking operation command (S760).

Figure 8:
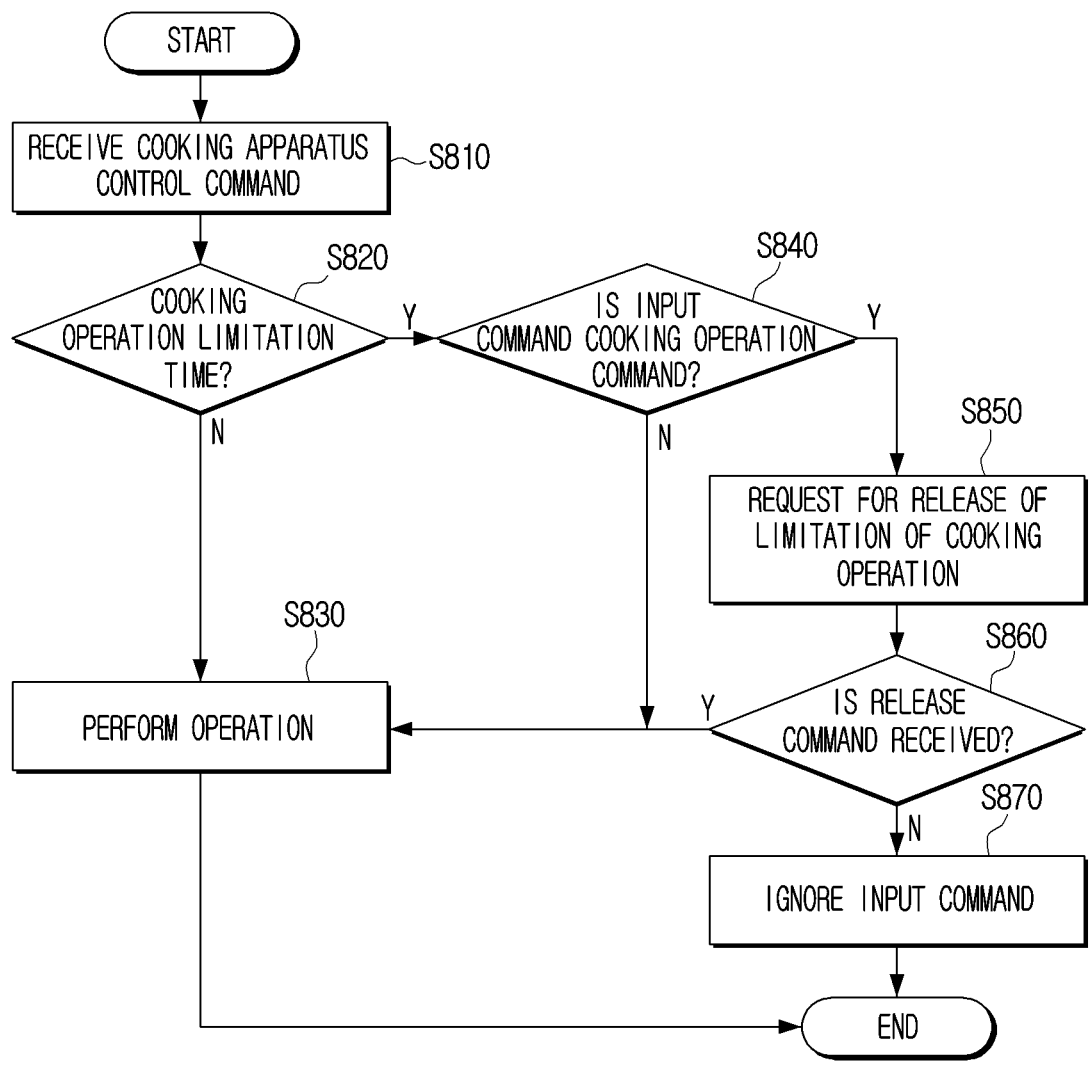
FIG. 8 is a flowchart illustrating a process of controlling the cooking apparatus during a cooking operation limitation time according to an embodiment.

FIG. 8 is a flowchart illustrating a process of controlling the cooking apparatus during a cooking operation limitation time according to an embodiment.

Referring to FIG. 8, the cooking apparatus may receive a cooking apparatus control command (S810). The cooking apparatus may identify whether it is the cooking operation limitation time (S820). If it is not the cooking operation limitation time, the cooking apparatus may perform the input control command (S830). If it is the cooking operation limitation time, the cooking apparatus may identify whether the input command is the cooking operation command (S840). If the input command is not cooking operation command, the cooking apparatus may perform the input control command (S830).

If the input command is the cooking operation command, the cooking apparatus may request the terminal device set at the level with the self-release authority of the cooking operation limitation or the authority for transmitting the limitation release command of the cooking operation, when another user inputs the cooking operation command, for the release of the limitation of the cooking operation (S850). The cooking apparatus may confirm whether the release command is received from the terminal device (S860). If the release command is received, the cooking apparatus may perform the cooking operation (S830).

In an embodiment, the cooking apparatus may confirm the self-release authority of the cooking operation limitation or the release authority for the other users based on the distance information. The cooking apparatus may ignore the release command received from the terminal device of which the location information does not indicate a house and which is set at a level not including the release authority for the other user. In other words, the cooking apparatus may determine that the release command is received. If the release command is not received from the terminal device, the cooking apparatus may ignore the input control command (S870).

Figure 9:
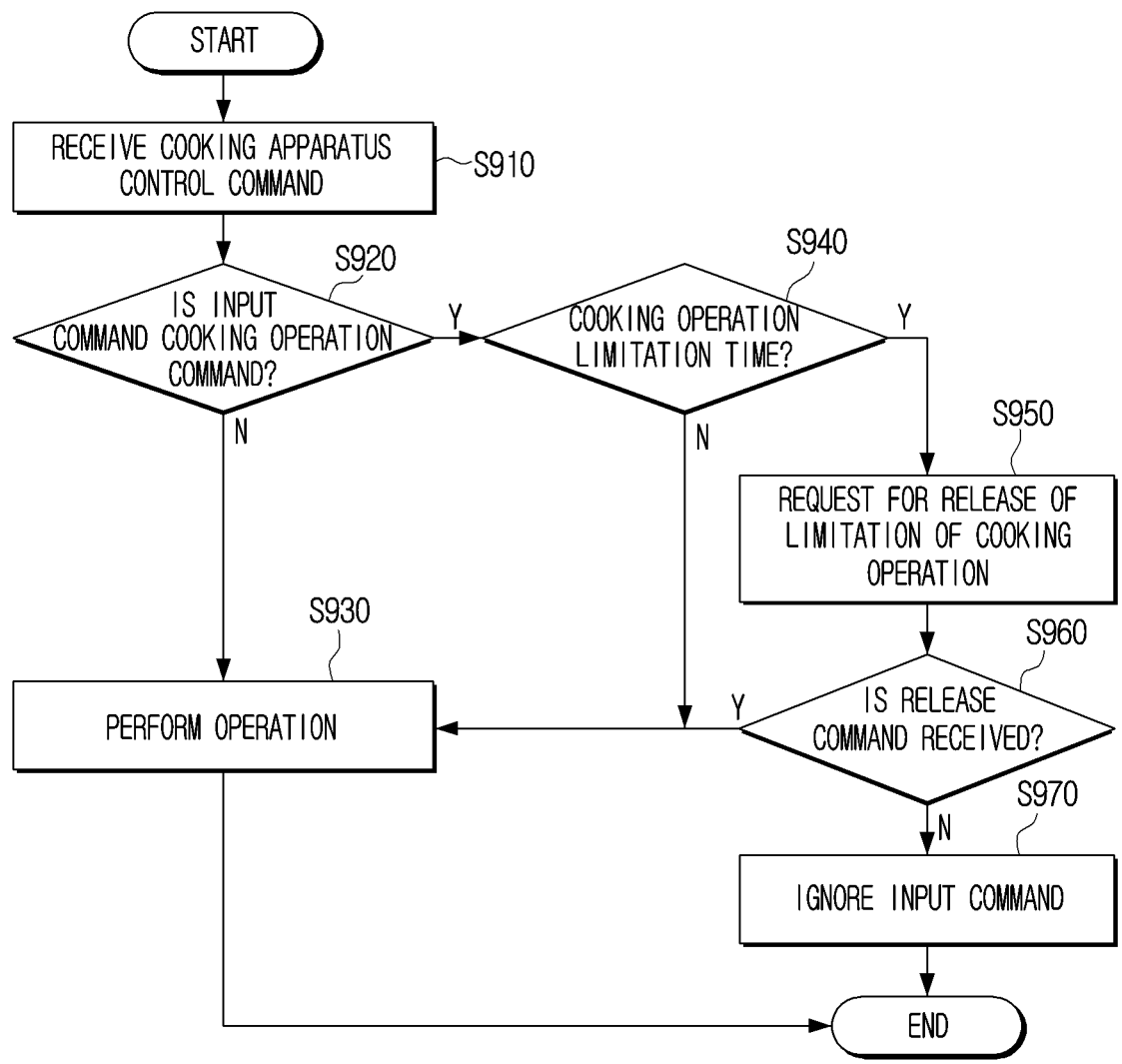
FIG. 9 is a flowchart illustrating a process of controlling the cooking apparatus during the cooking operation limitation time according to another embodiment.

FIG. 9 is a flowchart illustrating a process of controlling the cooking apparatus during the cooking operation limitation time according to another embodiment.

Referring to FIG. 9, the cooking apparatus may receive a cooking apparatus control command (S910). The cooking apparatus may identify whether the input command is the cooking operation command (S920). If the input command is not the cooking operation command, the cooking apparatus may perform the input control command (S930). If the input command is the cooking operation command, the cooking apparatus may identify that it is the cooking operation limitation time (S940). If it is not the cooking operation limitation time, the cooking apparatus may perform the input control command (S930).

If it is the cooking operation limitation time, the cooking apparatus may request the terminal device set at the level including the self-release authority for the cooking operation limitation or the authority for transmitting the limitation release command of the cooking operation, when another user inputs the cooking operation command, for the release of the limitation of the cooking operation (S950). The cooking apparatus may confirm whether the release command is received from the terminal device (S960). If the release command is received, the cooking apparatus may perform the cooking operation (S930). If the release command is not received from the terminal device, the cooking apparatus may ignore the input control command (S970).

Accordingly, the cooking apparatus and the cooking apparatus control system may limit only a cooking operation with a risk of fire or burn.

Figure 10:
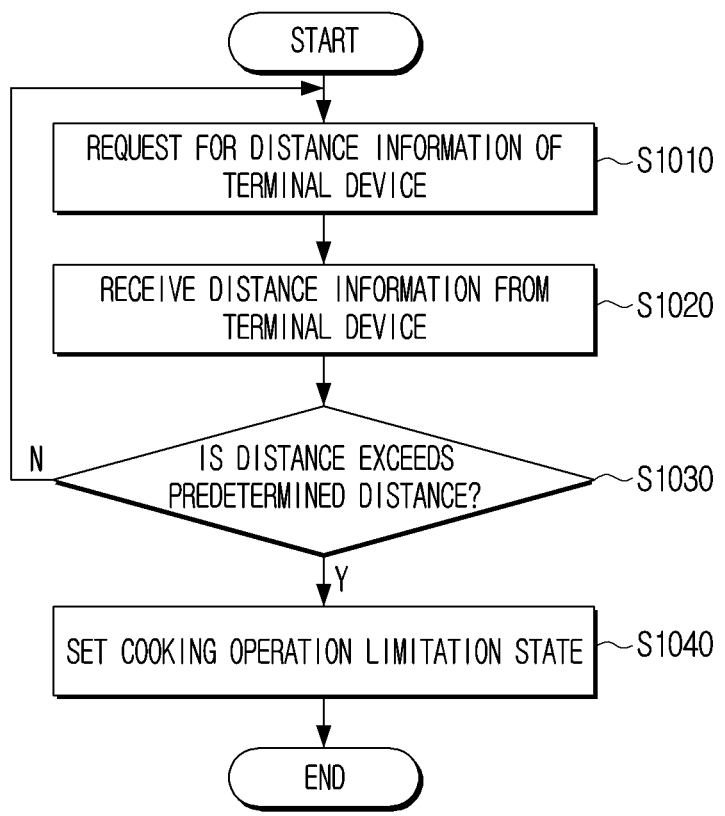
FIG. 10 is a flowchart illustrating a setting process of the cooking operation limitation state based on distance information of a terminal device according to an embodiment.

FIG. 10 is a flowchart illustrating a setting process of the cooking operation limitation state based on distance information of the terminal device according to an embodiment.

Referring to FIG. 10, the cooking apparatus may request for the distance information (or location information) of the terminal device (S1010) and receive the distance information from the terminal device (S1020). In an embodiment, if the cooking apparatus does not include a GPS module, the cooking apparatus may receive the distance information by requesting the terminal device for the distance information from the terminal device. The terminal device may include a GPS module. In addition, a location where the cooking apparatus is installed (e.g., house) may be set. Further, the terminal device may confirm the location of the terminal device. The terminal device may calculate a distance between the cooking apparatus and the terminal device based on the set location of the cooking apparatus and the location of the terminal device. The terminal device may transmit the distance information between the cooking apparatus and the terminal device to the cooking apparatus according to the request of the cooking apparatus.

If the cooking apparatus includes the GPS module, the cooking apparatus may confirm the location of the terminal device. The cooking apparatus may request the terminal device for the location information of the terminal device. The terminal device may transmit the location information of the terminal device to the cooking apparatus according to the request of the cooking apparatus. The cooking apparatus may confirm the distance from the terminal device based on the location information of the cooking apparatus and the received location information of the terminal device.

The cooking apparatus may determine whether the distance between the cooking apparatus and the terminal device exceeds a predetermined distance based on the received information (S1030). If the distance is equal to or shorter than the predetermined distance, the cooking apparatus may request the terminal device for the distance information (S1010) and receive the distance information from the terminal device (S1020). If the distance exceeds the predetermined distance, the cooking apparatus may be set in the cooking operation limitation state (S1040).

Therefore, the cooking apparatus and the cooking apparatus control system may automatically limit the cooking operation according to the distance from the user, without intentionally limiting the cooking operation by the user.

Figure 11:
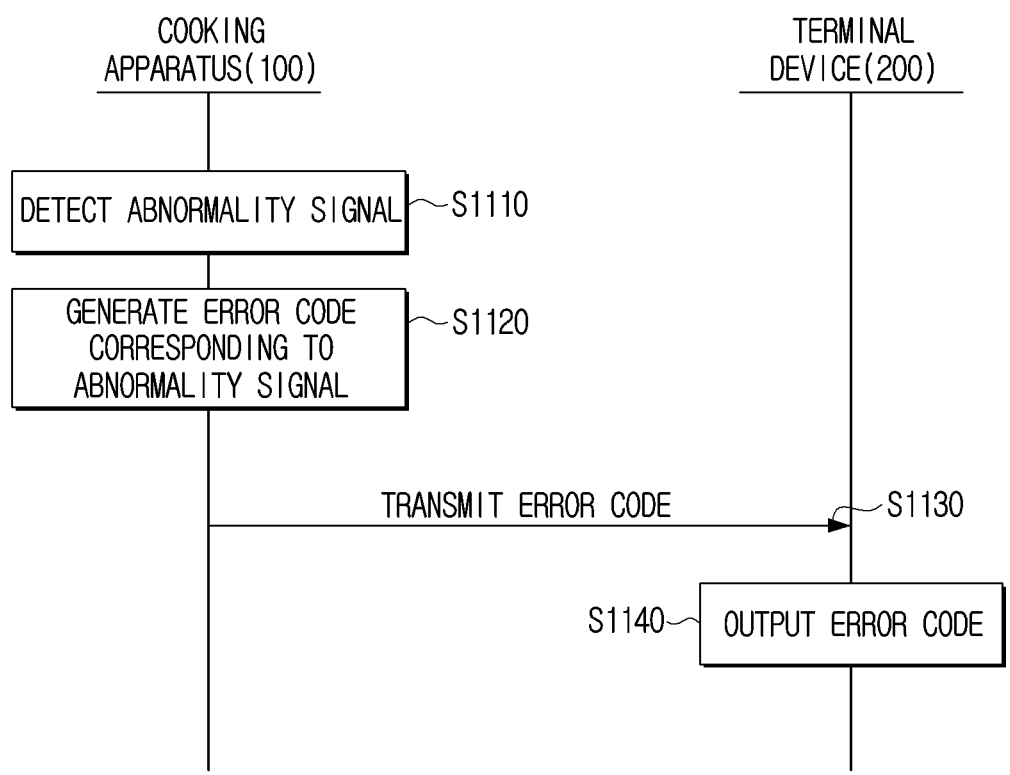
FIG. 11 is a sequence diagram illustrating a process of determining whether the cooking apparatus is abnormal according to an embodiment.

FIG. 11 is a sequence diagram illustrating a process of determining whether the cooking apparatus is abnormal according to an embodiment.

Referring to FIG. 11, the cooking apparatus 100 may detect an abnormality signal (S1110). For example, the abnormality signal may be a signal generated due to a high temperature error, a sensor error, a voltage error, a communication error, an abnormal key input error, and the like. The cooking apparatus 100 may generate an error code corresponding to the abnormality signal (S1120) and transmit the generated error code to the terminal device 200 (S1130). The cooking apparatus 100 may transmit the error code to the terminal device 200 set at the level including the monitoring authority. In the example of FIG. 5, the terminal device set at the control allowance level of the first or higher levels may include the monitoring authority. In other words, the cooking apparatus may transmit the error code to all terminal devices connected for communication.

The terminal device may output the received error code (S1140). The error code may include information regarding an error other than a classification code for classifying the errors. The user may confirm the output error code and determine the abnormality of the cooking apparatus and abnormality type.

Therefore, the user may always confirm the abnormality of the cooking apparatus.

Hereinabove, various control operations of the cooking apparatus have been described. Hereinafter, the cooking apparatus control system including an imaging device will be described.

Figure 12:
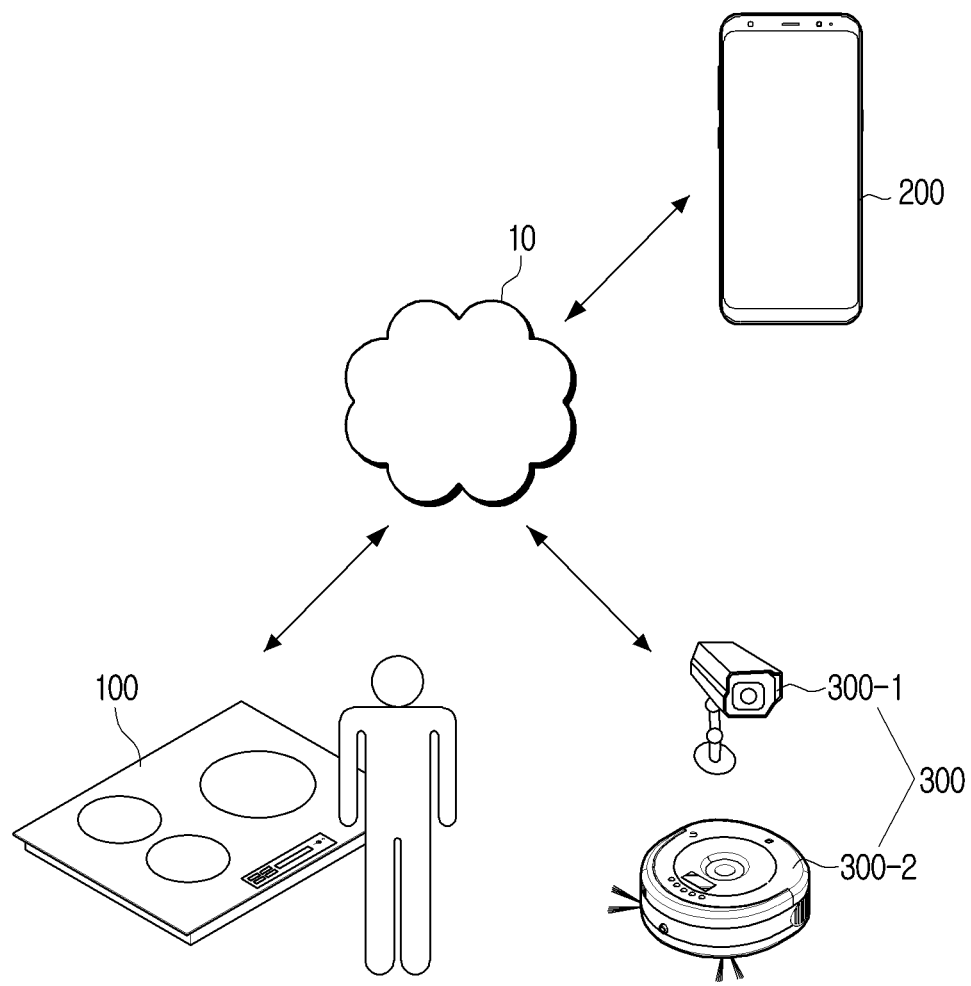
FIG. 12 is a diagram illustrating a cooking apparatus control system according to another embodiment.

FIG. 12 is a diagram illustrating a cooking apparatus control system according to another embodiment.

Referring to FIG. 12, the cooking apparatus control system may include the cooking apparatus 100, the terminal device 200, and an imaging device 300. The various control operations of the cooking apparatus 100 and the terminal device 200 are the same as in the description of FIG. 1, and therefore, the imaging device 300 and control operations related to the imaging device 300 will be mainly described.

The imaging device 300 may image the cooking apparatus 100 and the cooking apparatus surrounding environment. The imaging device 300 may include a fixed imaging device 300-1 and a movable imaging device 300-2. In an embodiment, the fixed imaging device 300-1 may include a closed circuit television (CCTV) and the movable imaging device 300-2 may include a robot cleaner. In an embodiment, the fixed imaging device 300-1 may be installed at a position where the cooking apparatus and the surrounding environment may be imaged. In addition, if a request for a captured image is received, the fixed imaging device 300-1 may image the cooking apparatus and the surrounding environment by changing a lens direction of a camera to a cooking apparatus direction. If a request for a captured image is received, the movable imaging device 300-2 may image the cooking apparatus and the surrounding environment by moving to a location where the cooking apparatus may be imaged. The above example is an embodiment and all devices which may capture an image including the camera may be included in the imaging device 300. Meanwhile, FIG. 12 illustrates an example of the cooking apparatus 100 and the separate imaging device 300, but as illustrated in FIG. 3, the cooking apparatus 100 may include the camera, depending on cases. If the cooking apparatus 100 includes the camera, the internal camera may perform the function of the imaging device 300.

The imaging device 300 may communicate with the terminal device 200. The imaging device 300 may communicate with the terminal device 200 via the network 10. For example, the imaging device 300 may include a data network communication module through LTE, Wi-Fi, or Bluetooth, and may communicate with the terminal device 200 via a short distance communication network and the Internet. The imaging device 300 may be not only connected directly to the terminal device 200 for communication, but may also be connected indirectly via an external device such as a server, a cloud, or a web server to perform the communication.

In an embodiment, the cooking apparatus 100 may receive a control command in the cooking operation limitation state. The cooking apparatus 100 may identify whether the input control command is the cooking operation command. In addition, the cooking apparatus 100 may confirm whether it is in the cooking operation limitation state. If the cooking apparatus 100 receives the cooking operation command in the cooking operation limitation state, the cooking apparatus 100 may request the terminal device 200 for the release of the limitation of the cooking operation. The cooking apparatus 100 may request the terminal device 200 set at the level with the release authority of the limitation of the cooking operation for the release of the limitation of the cooking operation.

If the request for the release of the cooking operation limitation state is received from the cooking apparatus 100, the terminal device 200 may request the imaging device 300 for a captured image. If the imaging device 300 receives a request for the captured image from the terminal device 200, the imaging device 300 may image a region including the cooking apparatus 100. In addition, the imaging device 300 may transmit the captured image to the terminal device 200. If the imaging device 300 is an internal camera included in the cooking apparatus 100, the terminal device 200 may request the cooking apparatus 100 for the captured image. In addition, the cooking apparatus 100 may transmit the captured image and the release request for the cooking operation limitation to the terminal device 200.

Therefore, the user may confirm the attempt of the cooking operation on the cooking apparatus or the abnormality of the cooking apparatus with eyes via the captured image.

Figure 13:
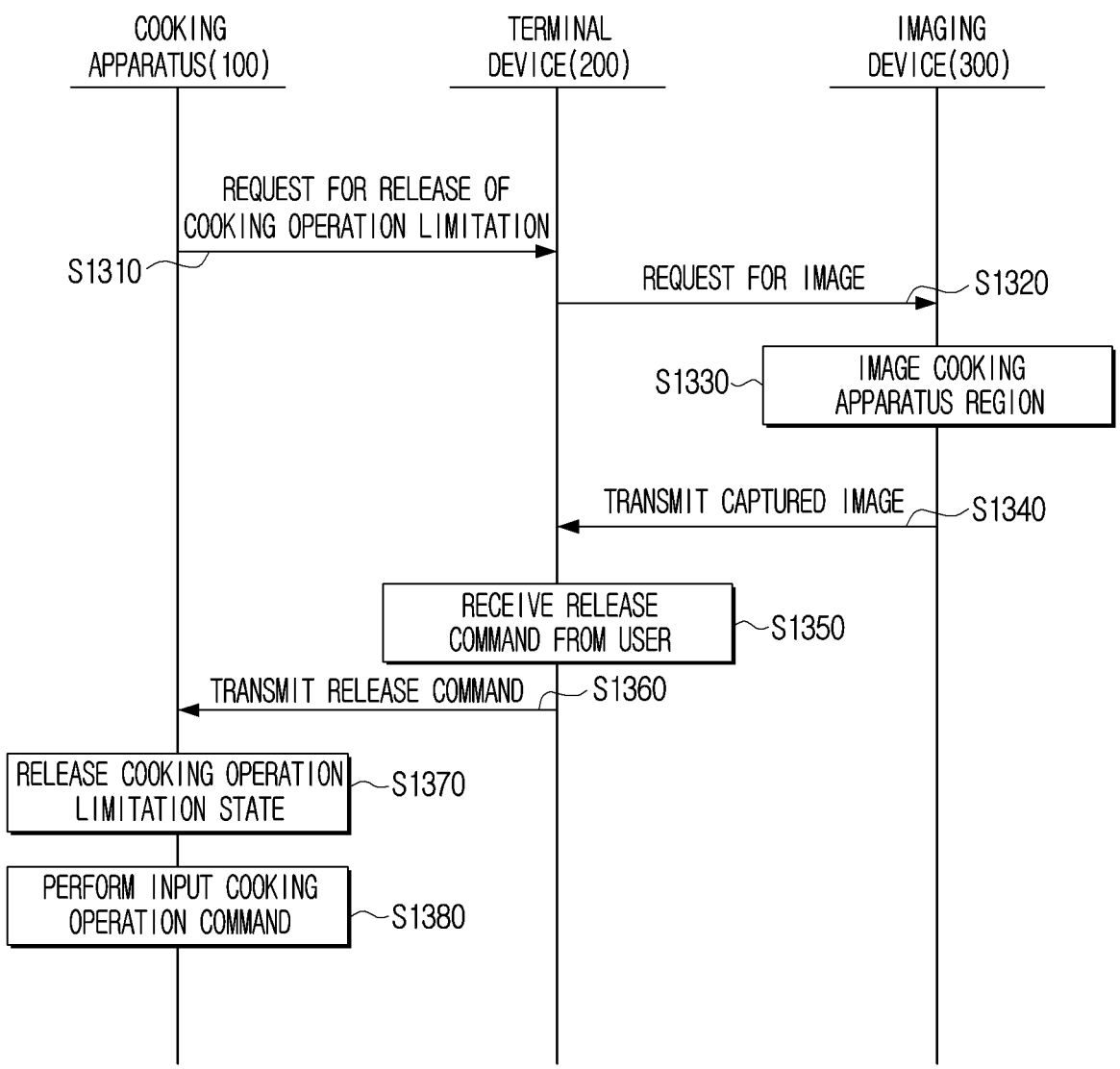
FIG. 13 is a sequence diagram illustrating a process of releasing the limitation state of the cooking operation based on a captured image according to an embodiment.

FIG. 13 is a sequence diagram illustrating a process of releasing the limitation state of the cooking operation based on a captured image according to an embodiment.

Referring to FIG. 13, the cooking apparatus 100 may request the terminal device 200 for the release of the cooking operation limitation (S1310). If there are the plurality of terminal devices, the cooking apparatus 100 may request the terminal device set at the level with the limitation release authority of the cooking operation for release.

If the request for the release is received from the cooking apparatus 100, the terminal device 200 may request the imaging device 300 for a captured image (S1320).

The imaging device 300 may image the cooking apparatus region (S1330) and transmit the captured image to the terminal device 200 (S1340). The imaging device 300 may transmit the captured image to a server (not illustrated) and the server may transmit the captured image to the terminal device 200. In addition, the imaging device 300 may transmit the captured image directly to the terminal device 200 via a network.

The user may look at the received captured image and determine whether to release the cooking operation limitation state. The terminal device 200 may receive the release command according to the user's selection (S1350). The terminal device 200 may transmit the release command to the cooking apparatus 100 (S1360).

If the release command is received, the cooking apparatus 100 may release the cooking operation limitation state (S1370). In addition, the cooking apparatus 100 may perform the input cooking operation command (S1380).

FIG. 14 is a sequence diagram illustrating a process of determining whether the cooking apparatus is abnormal based on the captured image according to an embodiment.

Referring to FIG. 14, the cooking apparatus 100 may detect an abnormality signal (S1410). For example, the abnormality signal may be a signal generated due to a high temperature error, a sensor error, a voltage error, a communication error, an abnormal key input error, and the like. The cooking apparatus 100 may generate an error code corresponding to the abnormality signal (S1420) and transmit the error code to the terminal device 200 (S1430). The error code may include information regarding an error other than a classification code for classifying the errors. The cooking apparatus 100 may transmit the error code to the terminal device 200 set at the level with the monitoring authority.

The terminal device 200 received the error code may request the imaging device 300 for the captured image (S1440).

The imaging device 300 may image the cooking apparatus region (S1450) and transmit the captured image to the terminal device 200 (S1460). The imaging device 300 may transmit the captured image to the terminal device 200 via an external device or transmit the captured image directly to the terminal device 200.

The terminal device 200 may output the captured image and the error code (S1470). The user may confirm the output error code and determine the abnormality of the cooking apparatus and the abnormality type.

The method for controlling the cooking apparatus according to various embodiments described above may be provided as a computer program product. The computer program product may include a S/W program itself or a non-transitory computer readable medium storing the S/W program.

The non-transitory computer-readable medium is not a medium storing data for a short period of time such as a register, a cache, or a memory, but may refer to a medium that semi-permanently stores data and is readable by a machine. Specifically, the various applications or programs described above may be stored and provided in the non-transitory computer-readable medium such as a CD, a DVD, a hard disk drive, a Blu-ray disc, a USB, a memory card, and a ROM.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A cooking apparatus comprising:
   an input interface configured to receive an instruction related to an operation of the cooking apparatus;
   a communication interface configured to communicate with a terminal device;
   a memory configured to store information related to a state of an operation of the cooking apparatus received from the terminal device through the communication interface; and
   a processor configured to:
      set the operation of the cooking apparatus to be performed according to the received instruction based on the stored information related to the state of operation of the cooking apparatus,
   wherein the processor is configured to:
      control the communication interface to send a request to the terminal device to release an operation limitation state that is set on the operation of the cooking apparatus upon the instruction being received via the input interface while the state of operation of the cooking apparatus is in the operation limitation state set,
      receive a control allowance level information sent form the terminal device and store the received control allowance level information by matching to identification information of the terminal device,
      receive a response to release the operation limitation state on the operation of the cooking apparatus based on the control allowance level information in response to the request to the terminal device to release the operation limitation state.

2. The cooking apparatus according to claim 1, wherein the instruction received through the input interface is for a cooking operation and the operation limitation state is related to limitation of the cooking operation, and
   the processor is configured to receive the control allowance level information regarding the cooking apparatus from the terminal device via the communication interface and store the received control allowance level information in the memory by matching to identification information of the terminal device, and
   wherein the control allowance level information comprises a plurality of levels allowing different control authorities and is set in relation to a plurality of terminal devices including the terminal device at different levels.

3. The cooking apparatus according to claim 2, wherein the processor is configured to control the communication interface to request the terminal device set at a level with release authority among the plurality of terminal devices for release of the limitation of the cooking operation.

4. The cooking apparatus according to claim 2, wherein the information related to the limitation of the cooking operation comprises at least one information of time information or distance information.

5. The cooking apparatus according to claim 4, wherein the processor is configured to:
   based on the information related to the limitation of the cooking operation being time information, control the communication interface to receive information regarding limitation time of the cooking operation from terminal device set at a level with limitation authority of the cooking operation, and set the cooking apparatus in the cooking operation limitation state based on the limitation time of the cooking operation.

6. The cooking apparatus according to claim 4, wherein the processor is configured to:
   based on the information related to the limitation of the cooking operation being distance information, control the communication interface to periodically receive distance information from the terminal device set at a level with limitation authority of the cooking operation and set the cooking apparatus in the cooking operation limitation state based on the distance from the terminal device set at the level with the limitation authority of the cooking operation.

7. The cooking apparatus according to claim 1, further comprising:
a sensor,
wherein the processor is configured to, based on an abnormality signal of the cooking apparatus being detected via the sensor, generate an error code corresponding to the detected abnormality signal and transmit the generated error code to the terminal device.

8. A method of controlling a cooking apparatus, the method comprising:
receiving information related to a state of an operation of the cooking apparatus from a terminal device;
storing the received information related to the state of the operation of the cooking apparatus;
requesting the terminal device to release an operation limitation state that is set on the operation of the cooking apparatus upon an instruction being input while the state of operation of the cooking apparatus is in the operation limitation state set;
receive a control allowance level information sent form the terminal device and store the received control allowance level information by matching to identification information of the terminal device;
receive a response to release the operation limitation state on the operation of the cooking apparatus based on the control allowance level information in response to the request to the terminal device to release the operation limitation state.

9. The method according to claim 8, the instruction input is for a cooking operation and the operation limitation state is related to limitation of the cooking operation, and the method further comprising:
receiving the control allowance level information regarding the cooking apparatus from the terminal device; and
storing the received control allowance level information by matching to identification information of the terminal device,
wherein the control allowance level information comprises a plurality of levels allowing different control authorities and is set in relation to a plurality of terminal devices including the terminal device at different levels.

10. The method according to claim 9, wherein the requesting comprises requesting the terminal device set at a level with release authority among the plurality of terminal devices for release of the limitation of the cooking operation.

11. The method according to claim 9, wherein the information related to the limitation of the cooking operation comprises at least one information of time information or distance information.

12. The method according to claim 11, wherein the receiving of the information comprises:
based on the information related to the limitation of the cooking operation being time information, receiving information regarding limitation time of the cooking operation from the terminal device set at a level with limitation authority of the cooking operation, and
wherein the method further comprises setting the cooking apparatus in the cooking operation limitation state based on the limitation time of the cooking operation.

13. The method according to claim 11, wherein the receiving the information comprises:
based on the information related to the limitation of the cooking operation being distance information, periodically receiving distance information from the terminal device set at a level with limitation authority of the cooking operation, and
wherein the method further comprises setting the cooking apparatus in the cooking operation limitation state based on the distance from the terminal device set at the level with the limitation authority of the cooking operation.

14. The method according to claim 8, further comprising:
based on an abnormality signal of the cooking apparatus being detected, generating an error code corresponding to the detected abnormality signal; and
transmitting the generated error code to the terminal device.

* * * * *